United States Patent [19]
Kaeufer et al.

[11] Patent Number: 4,514,351

[45] Date of Patent: Apr. 30, 1985

[54] PROCESS FOR THE MANUFACTURE OF ARTICLES OF HIGH MECHANICAL STRENGTH FROM THERMOPLASTIC SYNTHETIC RESINS

[75] Inventors: Helmut Kaeufer, Metzkausen; Lutz Rautenberg; Joachim Pahl, both of Berlin, all of Fed. Rep. of Germany

[73] Assignee: Deutsche Solvay Werke GmbH, Solingen, Fed. Rep. of Germany

[21] Appl. No.: 411,291

[22] Filed: Aug. 25, 1982

[30] Foreign Application Priority Data

Aug. 27, 1981 [DE] Fed. Rep. of Germany ....... 3133897

[51] Int. Cl.$^3$ ............................................. B29D 7/08
[52] U.S. Cl. .................................... 264/210.2; 264/70; 264/175; 264/237; 264/280; 264/294; 264/320
[58] Field of Search ...................... 264/210.2, 175, 280, 264/294–295, 237, 348, 120, 320, 68, 70, 289.3, 328.12, 210.7, 210.3, 23

[56] References Cited

U.S. PATENT DOCUMENTS

| | | | |
|---|---|---|---|
| 3,083,410 | 4/1963 | McGlamery | 264/294 |
| 3,165,505 | 1/1965 | Gaeth | 264/175 |
| 3,184,791 | 5/1965 | Gamble et al. | 425/174.2 |
| 3,409,717 | 11/1968 | Nozaki | 264/295 |
| 3,465,070 | 9/1969 | Smith et al. | 264/210.2 |
| 3,532,786 | 10/1970 | Coffman | 264/320 |
| 3,554,991 | 1/1971 | Griffith | 264/349 |
| 3,574,808 | 4/1971 | Matthews et al. | 264/294 |
| 3,686,388 | 8/1972 | Beckmann et al. | 264/295 |
| 3,757,718 | 9/1973 | Johnson | 264/296 |
| 3,883,631 | 5/1975 | Murray | 264/320 |
| 4,110,391 | 8/1978 | Berzen et al. | 264/120 |
| 4,234,536 | 11/1980 | Thiel et al. | 264/210.5 |
| 4,272,475 | 6/1981 | Chi | 264/210.1 |

FOREIGN PATENT DOCUMENTS

| | | | |
|---|---|---|---|
| 2856580 | 10/1980 | Fed. Rep. of Germany . | |
| 55-148127 | 11/1980 | Japan | 264/210.2 |
| 973476 | 10/1964 | United Kingdom | 264/175 |
| 512079 | 6/1976 | U.S.S.R. | 264/23 |

Primary Examiner—Jeffery Thurlow
Attorney, Agent, or Firm—Schwartz, Jeffery, Schwaab, Mack, Blumenthal & Koch

[57] ABSTRACT

The application discloses a process for the preparation of plates, films, sheets, strips, rods, molded parts, objects or profiles of high mechanical strength, from thermoplastic synthetic resinous materials, whereby the thermoplastic material is initially heated in an extruder or a similar installation equipped with a mixing and heating device to at least its melting or softening point, the emerging extruded mass subjected during or after a cooling process in a forming device, pressure drawing device or other accessory installation to at least one pressure stretching at a pressure from about 90 $N/mm^2$ to 1500 $N/mm^2$, preferably from about 155 $N/mm^2$ to 1000 $N/mm^2$, and/or to at least one pulsating pressure or shearing pressure treatment. Preferably, the pressure stretched or shearing pressure treated synthetic plastic material is subjected subsequently to at least one further tempering, preferably cooling and/or processing step. To carry out the process, an apparatus is used having at least one accessory device including one or more pressure rams and at least one nozzle, slot or a similar cross-section restriction in the form of an outlet orifice.

20 Claims, No Drawings

PROCESS FOR THE MANUFACTURE OF ARTICLES OF HIGH MECHANICAL STRENGTH FROM THERMOPLASTIC SYNTHETIC RESINS

BACKGROUND OF THE INVENTION

The present invention relates to a process for the manufacture of synthetic resinous plates, films, sheets, strips, rods, molded parts or shapes of high mechanical strength from thermoplastic synthetic resinous materials. The thermoplastic material is initially heated, in an extruder or a similar installation equipped with a heating and a mixing device, to or above its melting or softening point, the extruded mass leaving the extruder or extruderlike installation, is cooled entirely or partially to a temperature below the melting or softening point, and subsequently in an accessory installation it is exposed to a further processing process. According to the invention, during or after the cooling process, the thermoplastic material is subjected in a forming device, compression molding or another accessory installation, to compression deformation or compression stretching at high pressures (as a function of the synthetic resinous material and the temperature of the extruded mass) and/or to a pulsating pressure or shearing pressure treatment, with the compression formed or shear pressure treated synthetic resinous mass subsequently being subjected to at least one further tempering process, preferably a cooling and/or processing routine. The pressure treatment produces a flow process effecting a stretching. The invention further relates to an apparatus for the execution of the process.

A structure-forming process is already known from DE-OS No. 28 56 580, which is carried out in the forming tool by means of a special pressure deformation during cooling after the original molding or after a subsequent deformation or in a separate working process, whereby in addition to the external configuration desired, simultaneously molecular orientations are produced, which significantly improve the properties of the parts. It is necessary for this purpose to begin with an extruded, cast or injection-molded semi-finished product or preform, i.e., with a preformed synthetic resinous object, which subsequently is stretched under pressure, thereby producing a new, molecularly oriented molded part.

SUMMARY OF THE INVENTION

It is an object of the present invention to provide an improved process for the manufacture of molded or formed articles.

It is also an object of the invention to provide improved parts or objects produced by said process.

A particular object of the invention resides in providing a process whereby the production of shapes, such as, for example, plates, sheets, rods and the like can be accomplished by compression molding or pressure stretching.

In accomplishing the foregoing objects, there has been provided in accordance with the present invention a process for the preparation of a shaped article of high mechanical strength from a thermoplastic resinous material, comprising the steps of heat plastifying the thermoplastic material; extruding the thermoplastic material in the heat plastified condition as an extruded mass; cooling the extruded mass to a temperature below its melting or softening point; either during or subsequent to said cooling step, subjecting the extruded mass to a pressure-forming step at a pressure within the range of from about 90 N/mm$^2$ to 1500 N/mm$^2$, preferably from about 155 N/mm$^2$ to 1000 N/mm$^2$, to produce a shaped article having a predetermined cross-sectional configuration; and after said pressure-forming step, subjecting the shaped article to at least one further processing step, preferably a tempering step, e.g., a cooling step. Preferably, the pressure-forming step comprises a pressure stretching step. In one embodiment, the pressure-forming step comprises collecting the extruded mass of thermoplastic material in a collection zone and forcing the collected thermoplastic material under said pressure through an outlet orifice having a cross-section which is reduced in relation to the cross-section of the shaped article to produce a molecularly oriented shaped article. In another embodiment, after the pressure-forming step, the shaped article is subjected to at least one pulsating or shear pressure treatment. In still another embodiment, after the pressure-forming step, the shaped article is subjected to a laterally applied pressure treatment at a pressure of between about 160 N/mm$^2$ and 2000 N/mm$^2$.

In accordance with another embodiment, the process further comprises the step of introducing the thermoplastic material from the pressure-forming step into a second pressure confinement, preferable a closed mold, and maintaining the pressure for a period of from about 1 second to 5 minutes, preferably from about 10 seconds to 2 minutes.

According to still another embodiment, the process further comprises the step of subjecting the shaped article from the pressure-forming step to at least a second pressure-forming step, preferably passing the shaped article through at least one pair of compression rolls.

In accordance with another aspect of the present invention, there has been provided a process for the preparation of a shaped article of high mechanical strength from a thermoplastic resinous material, comprising the steps of heat plastifying the thermoplastic material; extruding the thermoplastic material in the heat plastified condition as an extruded mass; cooling the extruded mass to a temperature below its melting or softening point; either during or subsequent to said cooling step, subjecting the extruded mass to a pulsating or shear pressure treatment; and after said pressure treatment step, subjecting the thermoplastic material to at least one further processing step.

Further objects, features and advantages of the present invention will become apparent from the detailed description of preferred embodiments which follows.

DETAILED DESCRIPTION OF PREFERRED EMBODIMENTS

According to the invention, a process is provided for the manufacture of synthetic resinous plates, films, sheets, strips, rods, molded parts, objects and shapes of high mechanical strength from thermoplastic materials, whereby initially the thermoplastic material is heated, in an extruder or an extruder-like installation equipped with a mixing and a heating device, to or above its melting or softening point, the extruded mass leaving the extruder or the extruder-like installation, is cooled entirely or partially to a temperature below its melting or softening point, and subsequently in a forming apparatus, pressure stretching apparatus or other accessory installation it is exposed to at least one further processing routine. According to the invention, the thermoplastic material is subjected during or following the cooling process in an accessory installation to compression molding or pressure stretching at a pressure of from about 90 N/mm$^2$ to 1500 N/mm$^2$, preferably from about 160 N/mm$^2$ to 1000 N/mm$^2$ (depending on the synthetic resinous material involved and the temperature of the extruded mass), and/or to a pulsating pressure or shear pressure treatment, wherein the synthetic resinous mass deformed under pressure or treated with shearing pressure is subsequently exposed to at least one further tempering process, preferably a cooling or processing process.

According to a preferred embodiment, the extruded mass leaving the extruder is introduced into a forming, pressure stretching or other accessory installation, equipped with a cross-section reduction and an antechamber or chamber for receiving the extruded mass, and it is then extruded from a nozzle, a slot or a similar cross-section reduction designed as an outlet orifice of the forming, pressure stretching or other accessory installation under pressures of from about 90 N/mm$^2$ to 1500 N/mm$^2$, preferably from about 160 N/mm$^2$ to 1000 N/mm$^2$, and/or under pulsating pressure or shear pressure. Either prior to and/or during this extrusion, the extruded mass is subjected to a tempering phase, preferably a cooling phase. Subsequently, the extruded and molecularly oriented thermoplastic material is exposed immediately or with the interposition of an intermediate zone, to at least one further tempering process, preferably a cooling and/or processing routine.

According to one embodiment, the molecularly oriented thermoplastic material extruded from the forming apparatus, pressure stretching apparatus or accessory installation is pressed immediately, or with the insertion of an intermediate zone, into one or more molds or mold clusters, preferably closed molds or mold clusters, connected in a pressure-tight manner with the outlet orifice or the intermediate piece, with further molecular orientation and under simultaneous or subsequent tempering, preferably cooling. In this procedure, pressure is maintained during a period of time of from about 1 second to 5 minutes, preferably from about 10 seconds to 2 minutes. It is possible in this manner to produce high-strength synthetic resinous objects, molded parts and shapes or profiles.

According to a preferred embodiment, the surfaces of the extruded masses exiting from the extruder (per unit weight) are in a proportion of from about 30:1 to 1.1:1, preferably from about 15:1 to 1.2:1, in relation to the surface areas of the molded part or object made from them.

According to a further preferred embodiment, the pressure molded synthetic resin exiting from the outlet orifice of the forming, pressure stretching or other accessory installation equipped with a reduction in cross-section, is seized by at least one pair of rolls and subjected to a pressure stretching and/or stretching process.

Preferably, the pressure molded synthetic resin exiting from the outlet orifice of the forming, pressure stretching or similar accessory installation equipped with a cross-section reduction is further processed by compression stretching within the roll gap of at least one pair of calender rolls or compression rolls below the crystal melting point or softening point of the thermoplastic material, wherein at least one compression roll pair of the compression roll assembly used for the pressure stretching applies for a short time in the roll gap of one compression roll pair a line load of from about 100 N/cm to 900 N/cm, preferably from about 150 N/cm to 850 N/cm, to the pressure molded or pressure stretched synthetic resin parts of objects in the form of plates, films, strips, rods or profiles coming from the orifice of the accessory installation.

According to a further preferred embodiment of the process, at least one pair of compression rolls of the compression roll assembly used for pressure stretching applies a line load of from about 100 N/cm to 900 N/cm, preferably from about 150 N/cm to 850 N/cm, to the compression molded or pressure stretched molded parts or objects in the form of plates, films, sheets, strips, rods or profiles coming from the outlet orifice of the forming, pressure stretching or similar accessory installation, in the roll gap of a pair of compression rolls for a brief period of time, whereby said parts or objects are subjected to a flow rolling process. Following the first short term pressure stretching, but still within a regeneration period of the fatigue phenomena of the compressed zone and/or the relaxation time of the elastic recovery of the compressed zone of the thermoplastic material, the plates, films, sheets, strips, shapes, or the plate- or foil-like molded parts or the pressure stretched preforms are subjected to one or more further, short term pressure stretching steps and-/or pressure treatments in the roll gap of one or more further compression roll pairs, with the temperature of these rolls or pairs of rolls being equal to or lower than the temperature of the first compression roll assembly used for pressure stretching.

According to a particularly advantageous embodiment, the circumferential velocity of the rolls of the pairs of rolls used for pressure stretching and/or pressure treatment is equal. Each one of the rolls of the pairs of compression rolls used in the pressure stretching is driven directly or indirectly by a drive device.

The process according to the invention leads to an improvement of mechanical properties, preferably to improved impact tensile strength (impact bending strength), yield strength and tensile strength. Permeability for gaseous substances is reduced. Under certain process conditions, an increase in surface hardness was found.

Preferably, the temperature of the rolls or pairs of rolls arranged after the pair of compression rolls is maintained lower than the temperature of the first calender or compression assembly used for pressure stretching. The regeneration period of the fatigue phenomenon of the thermoplastic material is defined in this context as the time elapsing after, for example, a vigorous pressure treatment, until the plastic material has recovered from the fatigue effect. This fatigue phenomenon is also manifested by reduced elastic recovery. If the thermoplastic material is subjected to several, strong pressure treatments, successively within a short period of time, without sufficient time for the material to pass through a certain fatigue phase, embrittlement of the thermoplastic material occurs and the material may rupture (it may be "dead rolled"). If, therefore, repeated compression rolling with a correspondingly higher line load is performed successively within short periods of time, without the thermoplastic material being able to pass through a certain fatigue period, there is a danger of a negative change in mechanical properties, for example, embrittlement, or the risk of the rupture of the plate treated in this manner. If, on the other hand, the material passes through the entire phase of regeneration and recovery, respectively, and is exposed to a new pressure treatment only after this, the mechanical changes obtained by the new pressure treatment lead to the same results as those attained by the first pressure treatment under comparable conditions. It follows, that the new exposure to pressure of any area of the thermoplastic material within the range of the present invention and the present process conditions must occur within a certain period of time (5 seconds to 5 minutes, preferably 20 seconds to 3 minutes).

The time of relaxation or time of elastic recovery of the thermoplastic material is defined as the time within which a reduced elastic damping of the area exposed to pressure of the thermoplastic material coming from the roll gap is obtained. The time of the elastic or spontaneous elastic recovery (time of relaxation or regeneration) depends inter alia on the processing conditions and/or treatment conditions (rolling conditions, the line load chosen, etc.) and the thermoplastic material concerned (depending on the external conditions, the relaxation time need not necessarily be identical with the time of molecular relaxation).

The higher the rolling temperature chosen in the process according to the invention, the longer the regeneration or relaxation time. The harder, on the other hand, the thermoplastic material or the lower the rolling temperature, the more rapidly the low elastic damping will be restored.

For the process according to the invention and the corresponding process conditions, time periods for the processing conditions within the regeneration and relaxation times, respectively, are obtained which vary between about 5 seconds and 5 minutes, preferably between about 20 seconds and 3 minutes. A comparison of these times, in which the area exposed to pressure travels from one roll gap to the other and is exposed within the relaxation period to another pressure effect, with the time in which, for example, a film arrives from one roll gap to another roll gap of a conventional calender, shows that the former is a multiple of the latter. Similarly, many of the usual calenders are not suitable for the process according to the invention, due to the very high line load to be applied.

The additional pressure stretching(s) and/or post-forming pressure treatment(s) which follow subsequent to the first short time pressure stretching within the time interval of the relaxation or regeneration time of the thermoplastic materials can be effected in the transverse or longitudinal direction. In order to render a continuous process possible, the longitudinal direction is preferred as the working direction.

In one embodiment, the pressure stretching process according to the invention is preceeded, interrupted or followed by a drawing process (tensile drawing). According to a preferred embodiment, the plates, films, sheets, strips, profiles, plate- or film-like molded parts or preforms are subjected before or after the pressure stretching effected in the compression roll assembly to a drawing process, preferably a mono- or biaxial and/or a pressure treatment.

In the process according to the invention, the roll gap of the first and at least one further compression roll pair is adjusted as a function of the initial material thickness of the plates, films, sheets, strips or plate- or film-like molded parts so that the shortest distance of the rolls in the roll gap of the compression roll pairs used in pressure stretching amounts to from about 30 to 90%, preferably from about 50 to 75% of the material thickness (initial thickness). This range of roll gap setting provides an optimum degree of stretching.

Furthermore, the circumferential velocities of the rolls and roll pairs used for pressure stretching and/or post-forming pressure treatment should be equal so that a continuous process is obtained or additional stretching avoided. Each of the rolls of the roll pairs used in pressure stretching is driven directly or indirectly by a drive means.

The roll temperature of the rolls used in pressure stretching is between about 20° C. and a temperature (in °C.) which is lower by at least about 15% than the temperature of the crystal melting point or softening point of the thermoplastic synthetic material used. The temperature is preferably between about 30° and a temperature (in °C.) which is lower by at least about 20% than the temperature of the crystal melting point or softening point of the thermoplastic material used.

The pressure stretching of the plates, films, sheets, strips, profiles, plate- or film-like molded parts or preforms by the pairs of compression rolls (pressure rolls) arranged successively to each other or arranged at a distance from each other, is effected so that a stretching degree between about 0.9 and 0.30, preferably between about 0.75 to 0.50, is obtained, wherein the stretching degree is defined as the ratio of the material thickness after the stretching to the material thickness prior to stretching.

According to a preferred embodiment, the rolls and pairs of rolls used in pressure stretching and/or post-forming pressure treatment have identical roll diameters and the same rolling velocity.

According to a preferred embodiment, the compression roll(s) following the first compression roll assembly and used for a further short-time pressure stretching and/or post-forming pressure treatment is (are) adjusted to a temperature (in °C.) which is lower by at least about 5%, preferably at least about 10%, than the temperature (in °C.) of the first compression roll pair.

According to a preferred embodiment, the plates, films, sheets, strips, profiles, plate- or foil-like molded parts or preforms are heated prior to the first short-time pressure stretching to a temperature between about 26° C. and a temperature (in °C.) lower by at least about 20% than the temperature of the crystal melting point or softening point of the thermoplastic material used, preferably between about 30° C. and a temperature (in °C.) lower by at least about 30% than the temperature of the crystal melting point or softening point of the thermoplastic material used. If they are in the cold state, the plates are thus preheated or, if they are coming from production (for example, as preforms from a slot extrusion die) in the warm or hot state, they are cooled to this range. For polyvinylchloride and vinylchloride copolymers the range of this tempering (preheating or cooling) is between about 30° C. and 70° C., preferably between about 40° C. and 50° C. For polypropylene, the tempering range is between about 26° C. and 140° C., preferably between about 30° C. and 135° C. The range to be selected for individual polymers or copolymers depends on the proportion of the copolymer, the amount of the optionally present processing aids (for example, plasticizers and the like), the amount of additives optionally employed and of fillers, for example, calcium carbonate, glass fibers, short fibers and the like.

According to a further preferred embodiment, the pair or pairs of compression rolls of the compression roll assembly used for pressure stretching are followed by one or more post-forming treatment rolls, which as a function of the roll gap, identical with that of the roll pair used last for the pressure stretching (pressure rolls), apply a smaller line load on the passing, already pressure treated plates, films, sheets, strips, profiles, plate- or film-like molded parts or preforms, with the post-forming pressure treatment being effected still within the given interval of the regeneration and/or relaxation time of the elastic recovery of the thermoplastic material. According to this embodiment, it is possible to perform a post-forming pressure treatment on the thermoplastic material, including surface smoothing or improving, while largely maintaining the molecular orientation.

According to an advantageous embodiment, in this case two or more pairs of rolls are used for the pressure stretching (pressure rolls), wherein, with a constant roll gap, the line load applied to the plates, films, sheets, strips, profiles, plate- or film-like molded parts or preforms is increased in steps, with said pressure rolls being followed in sequence by one or more post-forming pressure treating rolls, which, as a function of their roll gap which is identical with that of the last compression pressure roll pair used for pressure stretching (pressure rolls), apply a smaller line load on the passing, already pressure treated plates, films, etc.

According to a further preferred embodiment, the roll gap, the roll velocity and the roll temperature are set so that on the surface of the plates, films, sheets, profiles, strips or preforms introduced for pressure stretching, a surface corrugation or groove-like configuration, which may extend over the entire cross-section, is effected after their passage through the roll gap of the compression roll pair or pairs employed in the pressure stretching, and that by means of at least one roll pair (post-forming pressure rolls) used for post-forming pressure treating, a post-forming pressure treatment is effected while largely maintaining the molecular orientation in the thermoplastic material, whereby the post-forming pressure treatment includes a smoothing of the surface.

In a further embodiment, it was found that the gap of the pair of compression rolls following the first pair of compression rolls may be slightly smaller, provided that the product of the line load ($L_2$) (measured at the second compression roll pair) and the gap width there ($s_2$) is smaller than the product of the line load ($L_1$) (measured during the passage through the first compression roll pair) and the gap width set therein ($s_1$).

It has been determined in numerous experiments that the best results of the process according to the invention are obtained when at least one roll pair of the calender used for the post-forming pressure treatment applies a line load of from about 75 N/cm to 700 N/cm, preferably from about 80 N/cm to 650 N/cm, to the plates, films, sheets, strips, profiles, plate- or film-like molded parts or preforms in the roll gap, with the pressure being varied as a function of the roll gap, wherein the roll gap has preferably the same distance as the compression roll pair used for compression stretching.

According to the process of the invention, the plates, films, sheets, strips or profiled pressure-formed parts, objects or preforms exiting from the extruder (the use of a wide slit extruder may be appropriate, especially for films, strips, plates and the like) may be transported directly to the compression roll pair, while maintaining the temperature range specified, i.e., optionally preferably with cooling to the temperature range according to the invention, so that the forming is effected by the compression rolls and subsequent rolls, in particular by the post-forming pressure treating rolls.

The resulting plates, films, strips, sheets, shapes or plate- or film-like molded parts are subjected, if a different configuration is desired, to deformation, preferably a deep drawing process, wherein the temperatures employed must be below the highest compression roll temperature used within the process according to the invention. If these temperatures are exceeded, additional measures (pressure absorbing molds and the like) must be taken.

All thermoplastic materials, for example, polyvinylidene chloride, polyamide, polyacetal, polyvinylfluoride, polyvinylidene fluoride, but preferably polyvinyl chloride, polypropylene, polyethylene, polyamide, polyacetals and their copolymers, may be used in the process of the invention. Preferably, in the process of the invention, thermoplastic materials are used which are partially crystalline (or contain certain crystalline ranges).

The plates, films, strips, sheets, profiles and the like made by the process according to the invention, have improved mechanical properties. Thus, for example, the plates, films, strips, sheets, shapes, plate- or film-like molded parts and objects have a higher yield strength and improved tensile impact strength, with the latter being found both in the axial direction of the web and also perpendicularly and/or transversely to said direction.

The yield strength of the pressure stretched plates increases in the direction of rolling. In a longitudinal cascade compression roll treatment, it remains approximately constant transversely to the rolling direction or decreases only slightly, whereby this process differs from other monoaxial stretching processes, wherein this property declines more strongly transversely to the stretching direction.

It was found furthermore that the density of the plates, films, strips, sheets, profiles and the like, pressure stretched by the process of the invention, can be lower than that of the initial material. By means of wide-angle x-ray investigations, scanning electron microscopy, microphotography, and density measurements, it was found that evidently a stronger orientation of the molecules of the synthetic plastic has been effected by the process according to the invention.

According to a further embodiment, the pressure-formed synthetic resin emerging from the outlet orifice of the forming device, pressure stretching device or accessory installation equipped with a reduction in cross-section is subsequently subjected to a pressure stretching or compression and/or shearing pressure treatment by means of laterally placed presses, at pressures of from about 160 N/mm$^2$ to 2000 N/mm$^2$, preferably from about 200 N/mm$^2$ to 1800 N/mm$^2$.

According to another embodiment, the extruded mass emerging from the extruder or an extruder-like installation is cooled entirely or partially to a temperature below the melting point or softening point and is exposed immediately, or following a pressure-forming process, to a pulsating pressure, shear pressure, or vibrating pressure treatment or to a ultrasonic treatment, wherein the extruded mass or the pressure-formed or pressure-stretched plates, films, strips, rods, or profiled synthetic resin objects exiting from the orifice of the forming or other device are passed between at least two plates of a press. At least one of the plates performs in an approximately tangential direction to the synthetic resin material an upward and downward motion (in one direction) in a vibrating or shaking manner, and the plastic material exiting from the pulsating compression device is subjected to a subsequent cooling and/or further processing step.

According to a preferred embodiment, the thermoplastic material leaves the extruder or a tool of the extruder as a thin-walled shaped element or as a thin extruded mass, with the extruded mass having an average material thickness or an average diameter of from about 0.3 mm to 30 mm, preferably from about 1 mm to 15 mm.

At or after its exit from the extruder, the extruded mass is partially cooled and placed in several layers one above the other or through each other, in at least one prechamber of a tool or directly in the forming-, pressure stretching- or accessory-installation, and either during or after the cooling process it is subjected to pressure-forming and/or a shear pressure treatment.

The invention concerns further installations for the production of synthetic resinous plates, films, sheets, strips, rods, molded parts, objects of profiles with a high mechanical strength, preferably for carrying out the process according to the invention. These installations consist of an extruder or a similar apparatus equipped with a mixing and heating device, together with several accessory devices. At least one forming device, pressure stretching device or other accessory installation contains one or more press rams and at least one nozzle, slot or a similarly formed cross-section reduction in the form of an outlet orifice, from which the synthetic resin is extruded during the pressure-forming or pressure stretching by means of the press rams. The apparatus also includes at least one cooling device preceding the accessory installation or located therein. Following this outlet orifice, one or more devices are arranged for the further processing and/or cooling of the material. As the device for further processing, according to one embodiment of the invention, a compression roll assembly or a compression roll pair is arranged after the outlet orifice.

This compression roll assembly consists of one or more pairs of rolls, of which at least one has the configuration of a pressure roll pair (compression roll pair) with the additional use of mechanical, hydraulic, electric and/or electromagnetic accessory devices, and preferably, also comprises a further pair of rolls utilizing mechanical, hydraulic, electric and/or electromagnetic accessory devices and acting as a pressure roll pair (compression roll pair) and/or as a post-forming pressure treating roll pair. Each of the rolls of the pairs of rolls employed in pressure stretching and in post-forming pressure treating is drivable directly or indirectly by means of a drive means and has the same roll diameter. According to one embodiment, at least one pair of rolls of the compression molding assembly used for compression stretching and having the additionally employed mechanical, hydraulic, electric and/or electromagnetic accessory device, is designed and arranged so that it applies by means of a compression or tensile stress a line load of from about 100 N/cm to 900 N/cm, preferably from about 150 N/cm to 850 N/cm, to the plates, films, sheets, strips and other molded parts, whereby the roll temperature of the second, third or n-th pair or rolls used in pressure stretching and/or post-forming pressure treatment is approximately equal to or lower than the temperature of the first pair of rolls used for pressure stretching (compression roll pair).

According to a preferred embodiment, in front of the first compression roll pair and/or in front of and/or at the outlet orifice of the accessory installation for pressure-forming (pressure stretching) a tempering device is arranged, preferably for cooling the plates, films, sheets, strips or plate- or film-like molded parts or preforms, wherein the tempering device is adjusted preferably to a temperature range between about 26° C. and a temperature (in °C.) which is lower by at least about 20% than the temperature of the crystalline melting point or softening point of the thermoplastic material used, preferably between about 30° C. and a temperature (in °C.) which is at least lower by about 30% than the temperature of the crystalline melting point or softening point of the thermoplastic material used.

According to the preferred embodiment of the process and with the aid of the apparatus of the invention, plates, films, sheets, strips, plate- or film-like molded parts or objects made of a synthetic resin with an initial thickness of more than about 2 mm, preferably more than about 2.5 mm, are preferably subjected to pressure stretching.

EXAMPLE 1

Polypropylene is plastified with the use of an extruder. The extruded mass emerging has a temperature at the outlet of 170° C. and an average diameter of approximately 12 mm. The cooling time is 4 minutes. The temperature of the extruded mass is lowered to approximately 120° C. immediately prior to the pressure stretching, while the installation used in the pressure stretching is maintained at a temperature of approximately 23° to 35° C. A pressure of 100–200 N/mm$^2$ is measured during pressing through the nozzle. The upper nozzle orifice (corresponding in the present case to the internal diameter of the installation) has a diameter of 22 mm, while the lower nozzle orifice is 20 mm long and 5 mm wide. A densifying pressure of 300 N/mm$^2$ is maintained. The material is forced by means of compression stretching into a tool, while maintaining a pressure holding time of 40 seconds using the above-mentioned densifying pressure. The rectangular plates made with the use of the tool have dimensions of 20×5×50 mm and exhibit increased tensile and impact bending strengths.

EXAMPLE 2

Low pressure polyethylene is pressure stretched using the same temperatures, devices, etc. as in Example 1, except that the strand emerging from the lower nozzle orifice is seized by a compression roll assembly and is subjected to a further pressure stretching. The original plate thickness is thereby reduced to 2.6 mm (initial thickness 5 mm).

What is claimed is:
1. A process for preparation of a shaped article of high mechanical strength from a thermoplastic resinous material comprising the steps of:
 heat plastifying the thermoplastic material;
 extruding the heat plastified thermoplastic material to form an extruded mass;
 cooling the extruded mass to a temperature below its melting or softening point;
 forcing the extruded mass in a first pressure-forming step either during or subsequent to said cooling step through an outlet orifice having a cross-sec- tion which is reduced in relation to the cross-section of said shaped article at a pressure within the range from about 155 N/mm² to 1000 N/mm²; and introducing the thermoplastic material after said first pressure-forming step into a second pressure-forming step in which the pressure is maintained on said thermoplastic material for a period from about 1 second to 5 minutes to produce an oriented, shaped article having a predetermined cross-sectional configuration;

the ratio of the surface area of the extruded mass per unit weight of the surface area of the shaped article comprising from about 30:1 to 1.1:1.

2. A process according to claim 1, wherein said first pressure-forming step comprises a pressure stretching.

3. A process according to claim 1, wherein after said first pressure-forming step, the thermoplastic material is subjected to at least one pulsating or shear pressure treatment.

4. A process according to claim 1, wherein the pressure in said second pressure-forming step is maintained for a time period from about 10 seconds to 2 minutes.

5. A process according to claim 1, wherein said second pressure-forming step comprises confinement in a closed mold.

6. A process according to claim 1, wherein the second pressure-forming step comprises subjecting the thermoplastic material to a pressure-stretching step between at least one pair of compression rolls wherein the at least one pair of compression rolls is maintained at a line load of between about 100 N/cm and 900 N/cm.

7. A process according to claim 6, wherein the thermoplastic material from a first pair of compression rolls is subjected to at least one further pair of compression rolls within a period of time following exit of the thermoplastic material from the first compression rolls which is still within the regeneration time of the fatigue phenomenon of the thermoplastic material, and wherein the temperature of the further compression rolls is not higher than the temperature of the first compression rolls.

8. A process according to claim 7, wherein the circumferential speed of each of the rolls of said first pair of compression rolls is equal to that of its paired roll.

9. A process according to claim 1, wherein the extruded mass is extruded with an average material thickness of from about 0.3 mm to 30 mm, at least partially cooled and subsequently collected in a plurality of layers prior to being subjected to said first pressure-forming step.

10. A process according to claim 3, wherein said pulsating or shear pressure treatment comprises passing the shaped article between at least two platens and moving at least one of said platens in a back-and-forth motion essentially tangentially to the surface of the shaped article.

11. A process according to claim 7, wherein the thermoplastic material is subjected to said at least one further pair of compression rolls within a period of time of from about 5 seconds to about 5 minutes following exit of the thermoplastic material from the first compression rolls.

12. A process according to claim 11, wherein said period of time is from about 20 seconds to about 3 minutes.

13. A process according to claim 6, wherein rolling is effected continuously in the longidudinal direction.

14. A process for preparation of a shaped article of high mechanical strength from a thermoplastic resinous material comprising the steps of:

heat plastifying the thermoplastic material;

extruding the heat plastified thermoplastic material to form an extruded mass;

cooling the extruded mass to a temperature below its melting or softening point;

subjecting the extruded mass either during or subsequent to said cooling step to a first pressure-forming step at a pressure within the range from about 155 N/mm² to 1000 N/mm²;

subjecting the thermoplastic material in a second pressure-forming step after said first pressure-forming step to pressure-stretching between at least one pair of compression rolls at a line load between about 100 N/cm and 900 N/cm.

15. A process according to claim 14, wherein the thermoplastic material from a first pair of compression rolls is subjected to at least one further pair of compression rolls within a period of time following exit of the thermoplastic material from the first compression rolls which is still within the regeneration time of the fatigue phenomenon of the thermoplastic material, and wherein the temperature of the further compression rolls is not higher than the temperature of the first compression rolls.

16. A process according to claim 15, wherein the circumferential speed of each of the rolls of said first pair of compression rolls is equal to that of its paired roll.

17. A process according to claim 14, wherein the extruded mass is extruded with an average material thickness of from about 0.3 mm to 30 mm, at least partially cooled and subsequently collected in a plurality of layers prior to being subjected to said first pressure-forming step.

18. A process according to claim 15, wherein the thermoplastic material is subjected to said at least one further pair of compression rolls within a period of time of from about 5 seconds to about 5 minutes following exit of the thermoplastic material from the first compression rolls.

19. A process according to claim 18, wherein said period of time is from about 20 seconds to about 3 minutes.

20. A process according to claim 14, wherein rolling is effected continuously in the longitudinal direction.

* * * * *